United States Patent
Richey et al.

(10) Patent No.: US 6,211,815 B1
(45) Date of Patent: Apr. 3, 2001

(54) COHERENT RADAR DETECTION USING NON-COHERENT ARCHITECTURE

(75) Inventors: Manuel Richey, Paola; Timothy Gibson, Overland Park, both of KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/541,473

(22) Filed: Mar. 31, 2000

Related U.S. Application Data

(63) Continuation-in-part of application No. 08/900,509, filed on Jul. 25, 1997, now Pat. No. 5,993,096.
(60) Provisional application No. 60/152,896, filed on Sep. 8, 1999.

(51) Int. Cl.[7] ...................................................... G01S 7/285
(52) U.S. Cl. ........................ 342/194; 342/21; 342/101; 342/189; 342/196
(58) Field of Search ................................ 342/21, 26, 89, 342/90, 99, 100, 101, 102, 103, 189, 192, 194, 195, 196

(56) References Cited

U.S. PATENT DOCUMENTS

| | | | |
|---|---|---|---|
| 3,803,598 | * | 4/1974 | Abernathy et al. .................. 342/192 |
| 5,793,703 | * | 8/1998 | Shippey ................................. 367/88 |
| 6,011,505 | * | 1/2000 | Poehler et al. ......................... 342/25 |
| 6,046,695 | * | 4/2000 | Poehler et al. ......................... 342/25 |

* cited by examiner

*Primary Examiner*—John B. Sotomayor

(57) ABSTRACT

In a radar system having a transmitter that produces pulses to be radiated by an antenna and a receiver that detects target information, complex demodulation is performed on an attenuated and limited waveform of the transmitter produced pulse. A matched filter is generated responsive to the complex demodulated waveform that is a time reversed conjugate image of the waveform corresponding to the produced pulse. Complex demodulation is performed on the return signal received by the receiver corresponding the produced pulse and the complex demodulated return signal is correlated with the matched filter that corresponds to the time reversed conjugate image of the waveform of the produced pulse.

51 Claims, 10 Drawing Sheets

COHERENT RADAR DETECTION USING NON-COHERENT ARCHITECTURE

This application claims priority under 35 U.S.C. § 119(e) to U.S. provisional application Ser. No. 60/152,896, filed Sep. 8, 1999 which is incorporated herein by reference in its entirety. This application is a continuation in-part of 08/900,609 filed Jul. 25, 1997 now U.S. Pat. No. 6,993,096.

FIELD OF THE INVENTION

The invention relates to radar systems and more particularly to target information extraction arrangements in radar systems.

1. Background of the Invention

In radar systems, energy from a pulse or other signal is radiated and a radio wave returned in response to the radiated signal is analyzed to determine location or other information of targets from which the radiation is reflected. Accordingly, radar detection equipment must provide accurate information of the returned radio wave.

A radar system may have a coherent or a non-coherent receiver. In a receiver using coherent detection, local oscillation is arranged to be synchronous with the signal produced by the transmitter that is radiated by the radar system antenna. Coherent radar detection utilizes both the magnitude and phase of the returned signal to extract target information. The phase is calculated with respect to an oscillator that is used to both generate the transmitted waveform and to down convert the received waveform for detection. The phase of the received signal is captured by performing a complex mixing operation on the incoming signal which results in real and imaginary components that can be expressed in polar coordinates as magnitude and phase. An example of a coherent detector is disclosed in U.S. Pat. No. 3,896,436 issued to G. F. Johnson Jul. 22, 1975. As is well known, coherent detection of radar returns provides a significant improvement in receiver sensitivity over non-coherent detection. The coherent detection also allows detection of Doppler shifts to estimate wind shear, etc. However, truly coherent receiver/transmitters for radar systems are complex and very expensive.

Non-coherent detectors for radar systems provide a less expensive alternative. In one radar system disclosed in U.S. Pat. No. 5, 589,833 issued to M. A. Randall Dec. 31, 1996, a return radio wave is down converted and processed in an analog pre-processor. The pre-processed signal is applied to a digital IF processor in which the signal corresponding to the return radio wave is A/D converted, split into in-phase and quadrature phase I and Q signals, converted to baseband through a low pass filter and then match filtered. The match filtering for each of the I and Q signals is performed in a digital signal processor programmed to optimally match available radar pulse widths transmitted by the radar system transmitter. The pulses from the radar system transmitter, however, change over time in shape and frequency so that the programmed matched filter for available radar pulse widths may not provide the needed detection accuracy or precision for the changes in transmitted pulses over time and under varying conditions.

2. Brief Summary of the Invention

The invention is directed to a radar system in which a transmitter produces a pulse to be radiated by an antenna. Radio waves returned in response to the radiated pulse are converted to a return signal in a receiver of the radar system. The return signal is complex demodulated and filtered through a filter to provide a signal for target information extraction.

According to the invention, the pulse produced by the transmitter is coupled to the receiver in which an attenuated waveform of the transmitter produced pulse is complex demodulated. A filter is formed in response to the complex demodulated pulse. The complex demodulated return signal is correlated with the filter formed in response to the complex demodulated waveform of the transmitter produced pulse.

According to one aspect of the invention, the filter formed in response to the complex demodulated pulse is a matched filter formed in response to the complex demodulated waveform of the transmitter produced pulse.

According to another aspect of the invention, the matched filter is a time reversed conjugate image of the waveform of the pulse produced by the transmitter.

According to yet another aspect of the invention, the complex demodulation waveform of the produced pulse is delayed for at least a time corresponding to its width.

According to still yet another aspect of the invention, the produced pulse coupled to the receiver is attenuated prior to its complex demodulation.

According to still another aspect of the invention, the produced pulse is coupled through a circulator and a receiver-transmitter-isolation switch and an attenuator between the transmitter and the receiver.

In an embodiment of the invention, the receiver is a non-coherent receiver and the signal from the receiver is processed in a digital signal processor which operates to down convert the signal applied thereto using a complex sinusoid IF signal to form baseband in-phase I and quadrature phase Q signals. The baseband I and Q signals corresponding to the transmitter pulse are processed in the digital signal processor to form a matched filter representative of a time reversed conjugate image of the transmitted pulse. The return signal from the receiver is complex demodulated in the digital signal processor using the complex sinusoid IF signal and the demodulated I and Q signals for the return signal are correlated with the matched filter in the digital signal processor to provide a signal for target information extraction.

DETAILED DESCRIPTION

Figure 1:
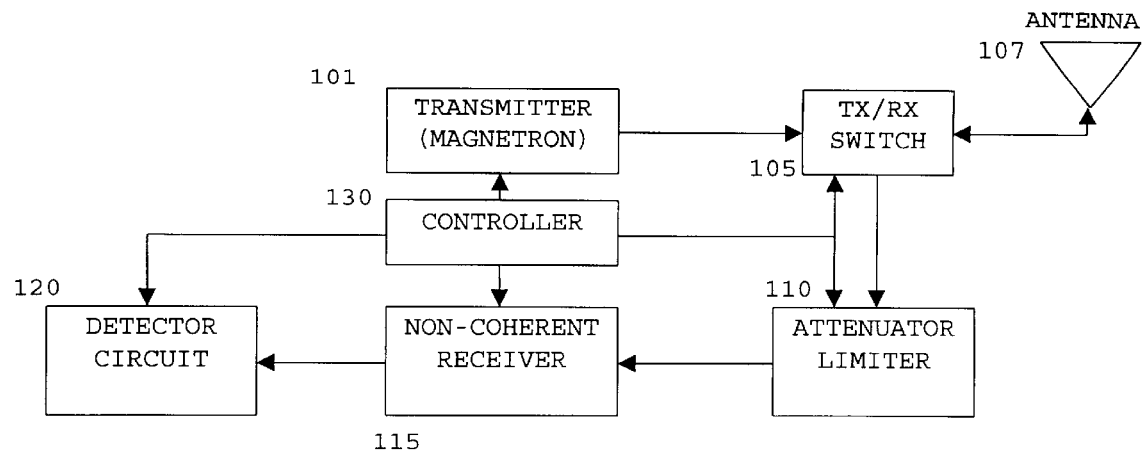
FIG. 1 depicts a radar system using a non-coherent receiver according to the prior art.

FIG. 1 shows a prior art arrangement of a radar system having a transmitter 101 such as one utilizing a magnetron, a transmit/receive switch 105, an antenna 107, an attenuator-limiter 110, a non-coherent receiver 115, a detector circuit 120 and a controller 130. The transmitter 101 produces a pulse that is coupled to the antenna 107 through the transmit/receive switch 105 under control of controller 130. A typical transmitted waveform of the magnetron pulse is defined in table 1.

TABLE 1

| Ifc = 9000 | Center Frequency (GHz) |
|---|---|
| offset = 100 | Maximum frequency error (KHz) |
| Mpe = π/100 | Maximum phase error (radians) |
| Pw = 0.5 | Pulse width (µsec) |

The antenna 107 radiates the pulse generated by transmitter 101 and receives return radio waves corresponding to the radiated pulse. After the pulse is radiated, the transmit/receive switch 105 under control of controller 130 couples the return radio waves from the antenna 107 to attenuator-limiter 110 and therefrom to the non-coherent receiver 115. The receiver 115 down converts the returned radio waves and provides a baseband signal to the detector circuit 120 which extracts the desired target information. The receiver and the signal detector of FIG. 1, however, provide non-coherent detection and do not utilize both the magnitude and phase of a return signal to extract target information from the return signal.

Figure 2:
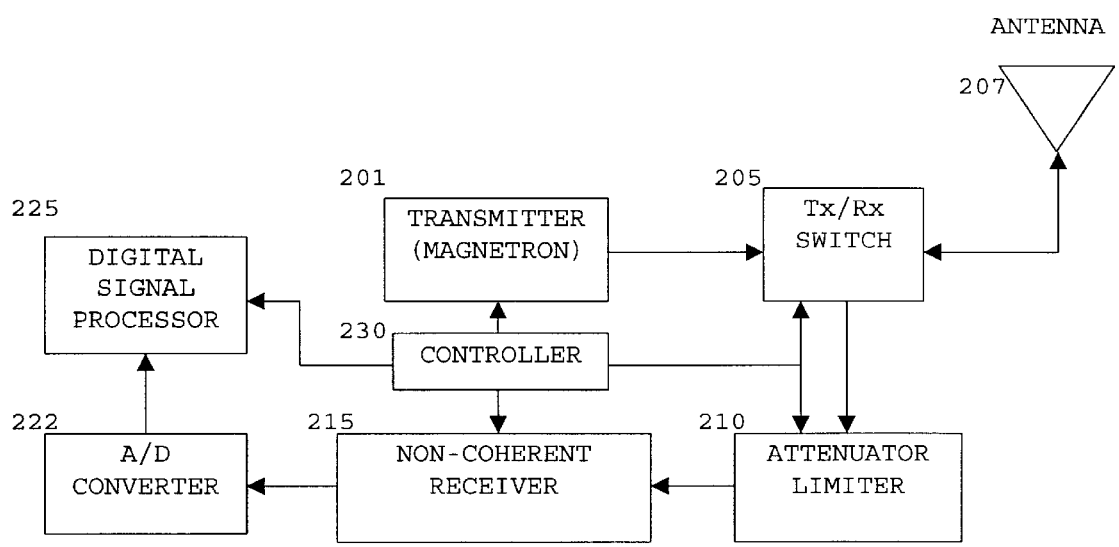
FIG. 2 depicts a radar system using a non-coherent receiver with transmitter pulse coupling and DSP filter processing according to the invention.

FIG. 2 depicts a radar system embodying the invention that utilizes digital processing of a signal obtained from the transmitter pulse in the receiver to provide detection utilizing both the magnitude and the phase of the return signal. The circuit of FIG. 2 includes a transmitter 201, a transmit/receive switch 205, an antenna 207, an attenuator-limiter 210, a non-coherent receiver 215 and a controller 230 as in FIG. 1. The circuit further includes an A/D converter 222 and a digital signal processor 225. In operation, the radar system shown in FIG. 2 is periodically set in a transmit period by the controller 230 so that a magnetron in the transmitter 201 produces a pulse which is coupled through the transmit/receive switch 205 to the antenna 207. The controller 230 sets the transmit-receive switch 205 and the attenuator-limiter 210 so that the transmit pulse is also applied through the attenuator-limiter 210 to the non-coherent receiver 215. The output of the receiver 215 is converted to a digital signal in A/D converter 222 and this digital signal is down converted by the digital signal processor 225. The down converted signal is then processed in the digital signal processor 225 to form a matched filter corresponding to the transmit pulse. The waveform corresponding to the transmitter obtained from the receiver 215 at the input to the digital processor 225 in the digital domain is illustrated in Table 2.

TABLE 2

| Ifc = 16 | Intermediate Frequency (Mhz) |
|---|---|
| FC(x) = (ifc + rnd(offset) − offset/2)*x | frequency of noisy transmitted signal |
| Length = Pw*2 = 1 | Total Sample Length (µsec) |
| Tfs = 64 | Transmitting sampling frequency (MHz) |
| Lastsamp = (length/1000)*Tfs | No. of samples for transmitted signal |
| s = 0, . . . , lastsamp − 1 | index for the transmitted pulse |
| Sig$_s$ = sin(2*(π/Tfs)*fc(s) + rnd(Mpe)) | Signal generated by transmitter (magnetron Pulse) |

Figure 3:
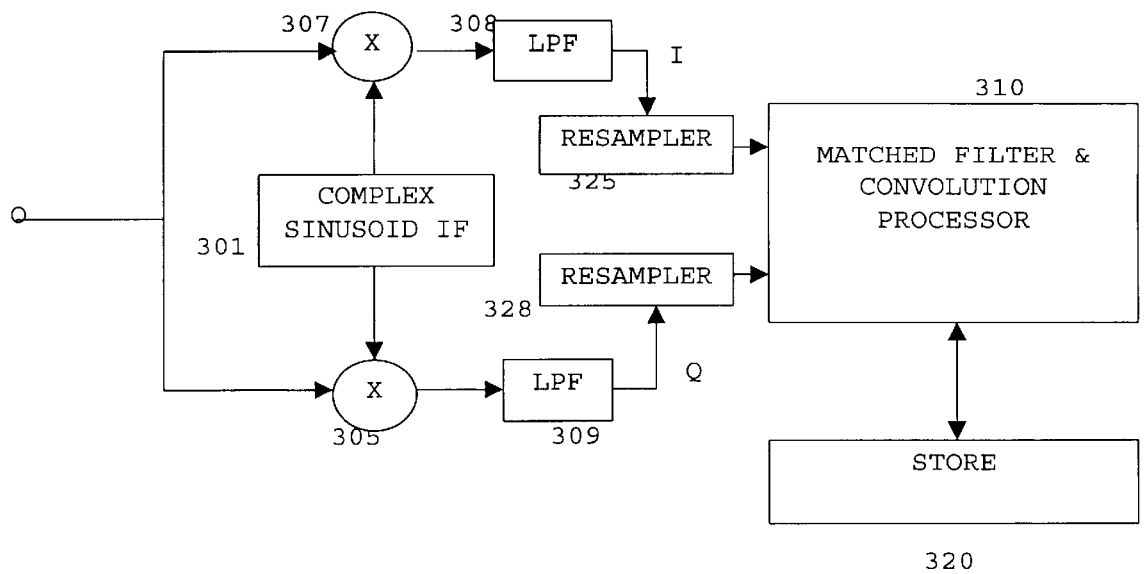
FIG. 3 shows schematically a circuit arrangement for processing coupled transmitter signals and received radio waves in the receiver in FIG. 2 according to the invention.

FIG. 3 illustrates a processing arrangement in the digital signal processor 225 such as the Texas Instrument type TMS 320C6701 for the digital signal from the A/D converter 222. The arrangement of FIG. 3 schematically shows the down conversion and resampling performed by the digital signal processor as being performed in complex sinusoid IF oscillator 301, mixers 305 and 307, low pass filters 308 and 309 and resamplers 325 and 328 and shows matched filter and convolution processing of the digital signal processor as being performed in a processor 310 under control of instruction codes stored in a store 320.

Figure 4:
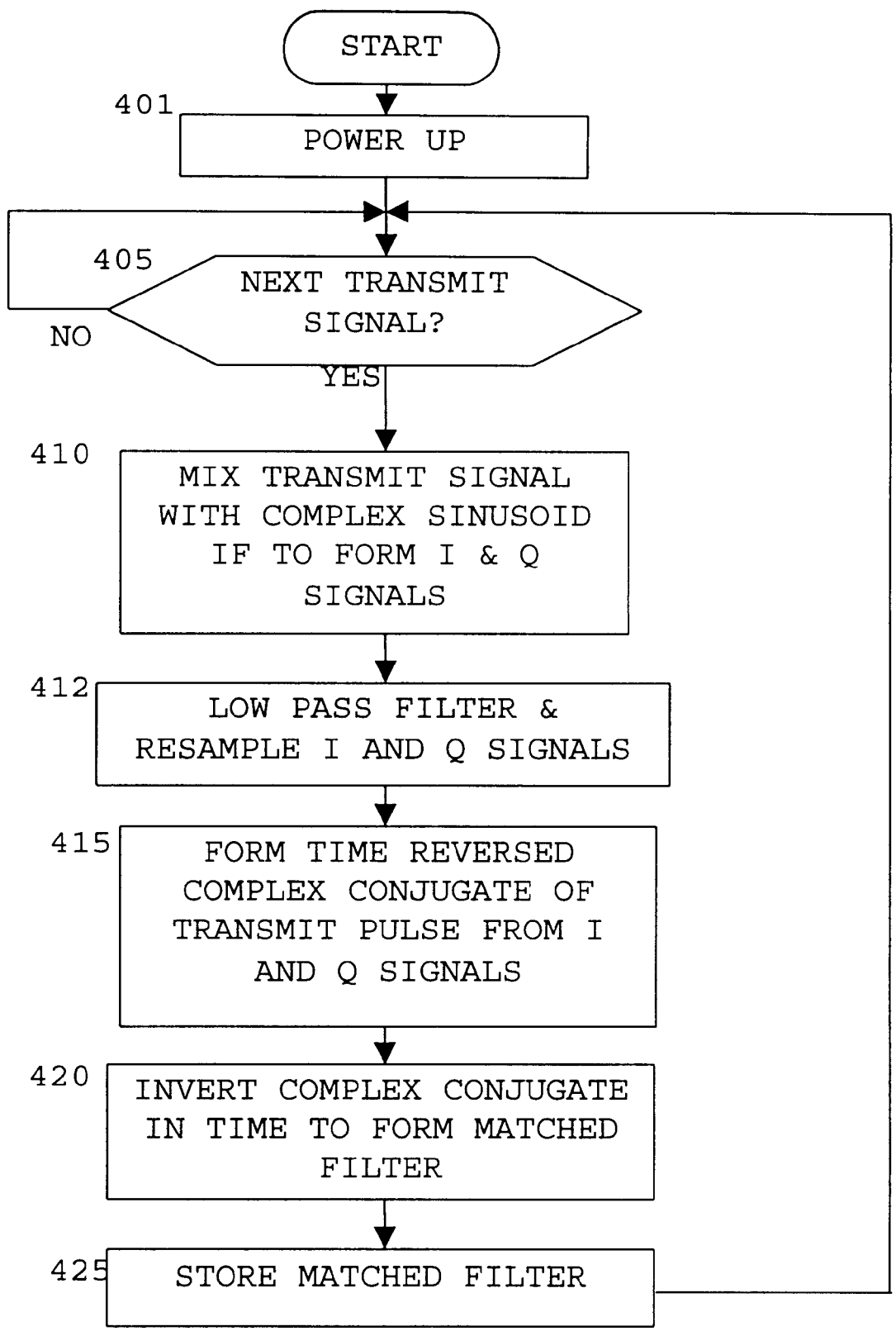
FIG. 4 is a flow chart illustrating the processing of the transmitter pulse coupled to the receiver in FIG. 2 according to the invention.

The operation of the arrangement of FIG. 3 during the transmit period set by the controller 230 is shown in the flow chart of FIG. 4 which corresponds to a set of instruction codes in the store 320 for controlling the operation of the digital signal processor 310. After power-up in step 401 of FIG. 4, decision step 405 is entered in which it is determined whether the next transmit signal from the transmitter 201 is starting. If no, the step 405 is reentered until start of the transmit pulse. If yes, the transmit pulse coupled through transmit-receive switch 205, the attenuator-limiter 210, the non-coherent receiver 215 and the A/D converter 222 is processed in the digital signal processor. The digital signal processor operates to mix the coupled pulse with the complex sinusoid intermediate frequency oscillator signal from the oscillator 301 as indicated by the mixing arrangement shown as mixers 305 and 307 to form in-phase and quadrature phase signals I and Q in step 410. The down converting of the transmit pulse defined in tables 1 and 2 is performed by the digital signal processor 225 according to:

rsig$_s$=mix$_s$*sigs, where the mixing signal is mix$^s$= $e^{i*2*\pi*s*Ifc/Tfs}$ The digital signal processor then operates to low pass filter the mixed signals in the step 412 to remove high frequency components after the mixing process according to the filtering process defined in table 3.

TABLE 3

| cutoff = lastsamp/8 | cutoff frequency bin |
|---|---|
| filt$_s$ = if(cutoff < s < lastsamp − cutoff, 0, 1) | passband and stop band frequency bins (i.e., if s > cutoff or less than lastsamp − cutoff, frequency domain filter coefficient is 0 otherwise 1) |
| filt$_{cutoff}$ = 0.70 | positive frequency transition point |
| filt$_{lastsamp-cutoff}$ = 0.707 | negative frequency transition point |
| frsig = cfft(rsig) | complex Fourier transform of received transient signal |
| frsig$_s$ = frsig$_s$ − filt$_s$ | frequency domain convolution of |

TABLE 3-continued

| | |
|---|---|
| rsig = ccifft(frsig) | filter with received signal complex inverse Fourier transform resulting in time domain output of lowpass filter. |

The outputs of the low pass filtering indicated by filters 308 and 309 are resampled in resamplers 325 and 328 and the resampled I and Q signals are processed to form the matched filter by the matched filter processing of matched filter and convolution processor 310.

The digital signal processor 310 which is controlled according to instructions stored in the store 320 is set to form a time reversed complex conjugate of the original transmit pulse from the resampled I and Q outputs of the resamplers 325 and 328 as indicated in steps 415 and 420 in accordance with $$matched_s = (Re(rsig_{lastsamp-1-s}))$$
$$-i * Im(rsig_{lastsamp-1-s}).$$

Figure 7:
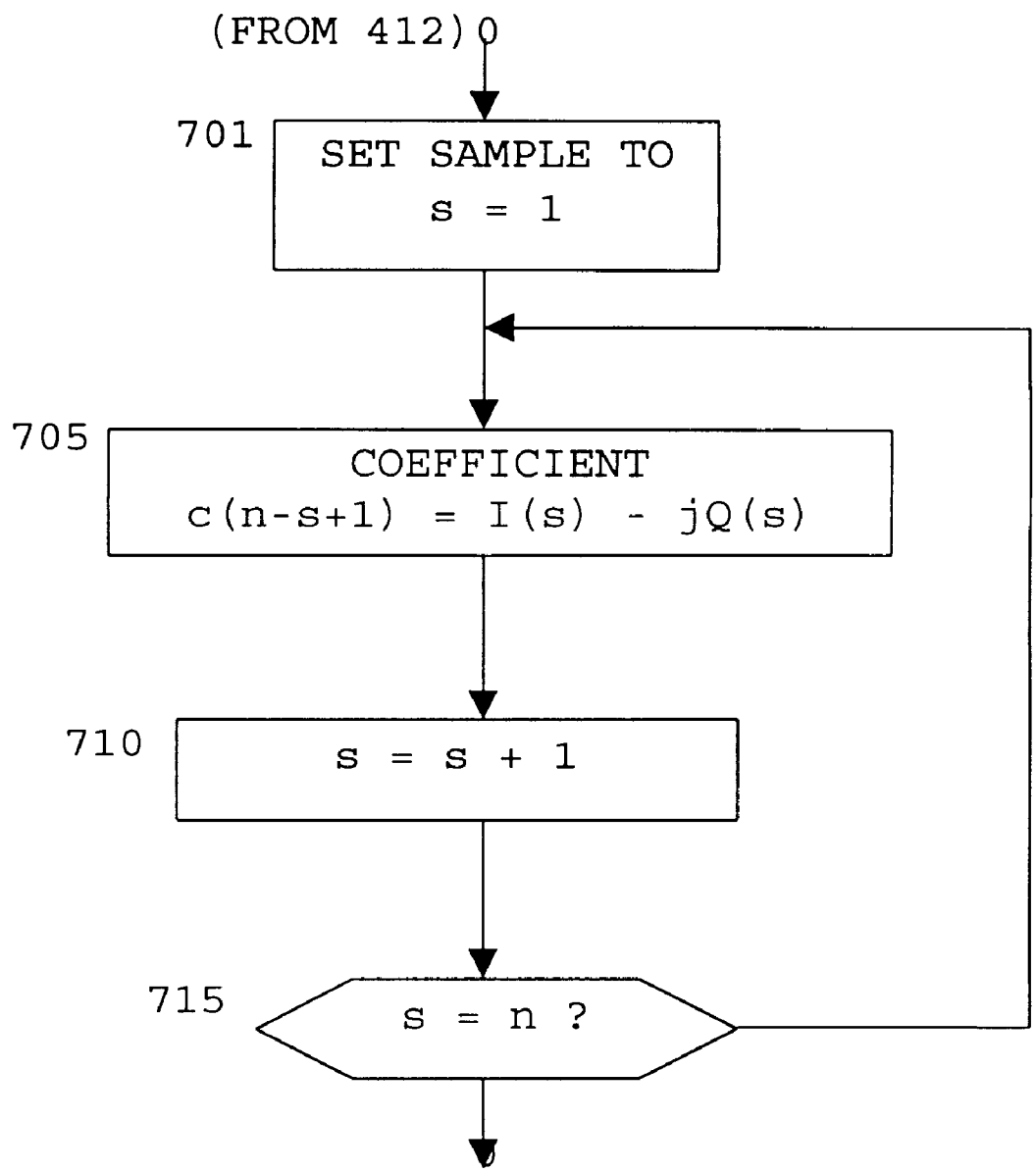
FIG. 7 is a more detailed flow chart showing the formation of the inverted time reversed complex conjugate of the transmit pulse indicated in FIG. 4.

The forming of the time reversed complex conjugate of the transmit pulse of step 415 and its inversion in time and storage in steps 420 and 425 in the processor 310 is shown in more detail in FIG. 7. Referring to FIG. 7, the sample index s of the I and Q signals is set to one in step 701 and the coefficient of the inverted time reversed complex conjugate for the sample n−s+1 is generated in step 705 from I(s) and Q(s) where n is the pulsewidth in samples. The sample index is incremented by one in step 710. Until the last sample n, the steps 705, 710 and 715 are iterated to form the coefficients for s=1 through s=n. After processing of the nth sample, control is returned to step 405 of FIG. 4.

Control is passed to the step 401 after the matched filter coefficients obtained from the digital signal processor are stored in the store 320 (step 425). According to the invention, the matched filter for a return signal may correspond to the transmitted pulse creating the return signal. Alternatively, the matched filter may be produced in response to every second, third or nth transmitted pulse.

Figure 5:
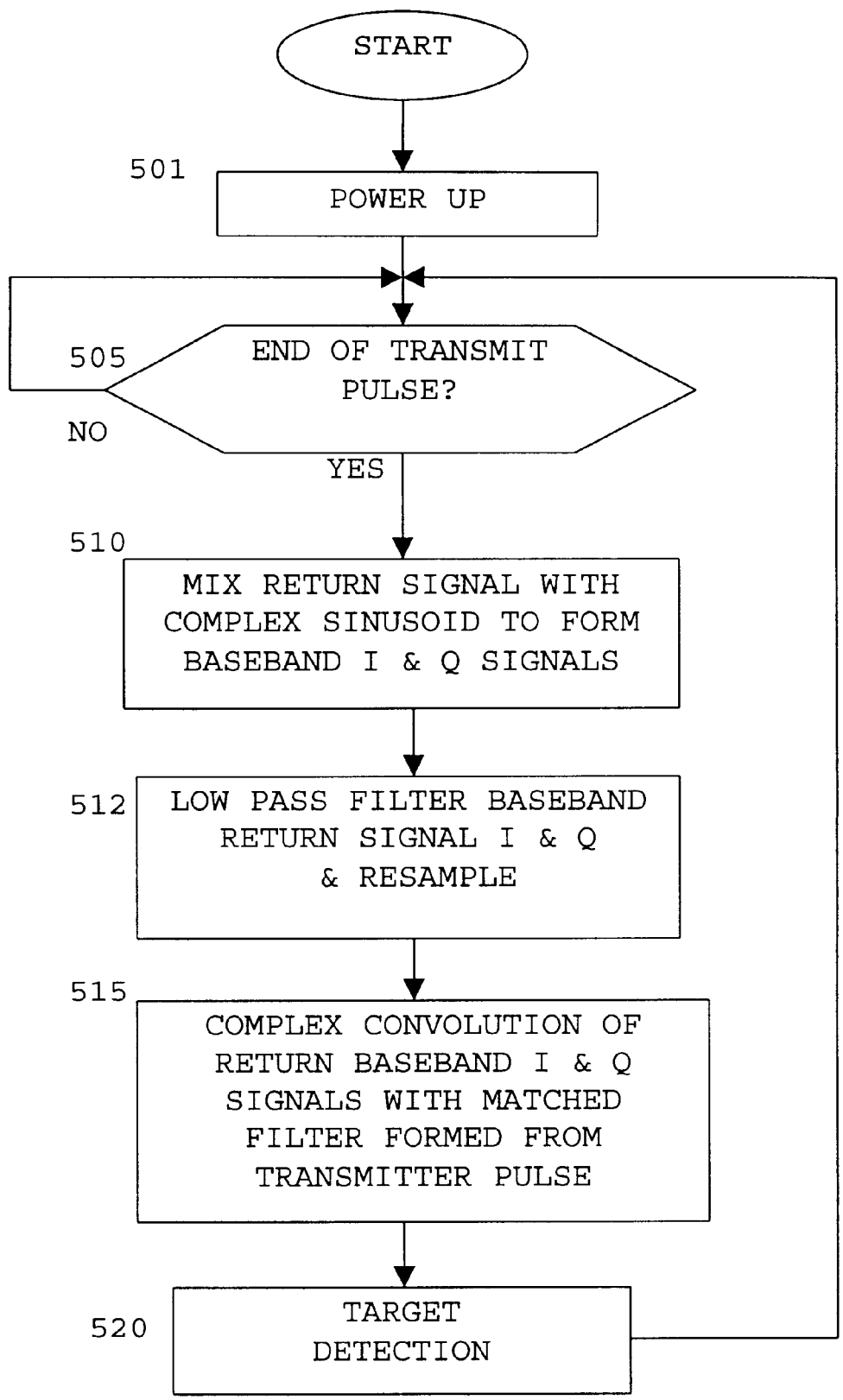
FIG. 5 is a flow chart illustrating the processing of return signals in the receiver of FIG. 2 according to the invention.

The flow chart of FIG. 5 illustrates the operation of the circuit of FIG. 3 during reception of the return signal in response to the transmitted pulse. After power-up in step 501, the controller is set in a return signal mode by a determination in decision step 505 that it is the end of the transmit pulse. If the transmit pulse period is not ended, the step 505 is reentered until the end of the transmit pulse is detected. When the end of the transmit pulse is determined, control is passed to step 510 in which the return signal at the inputs of the mixers 305 and 307 is demodulated by mixing with the complex sinusoid IF signal from signal generator 301 in accordance with:

$$rsig_s = mix_s * sig_s, \text{ where the mixing signal is}$$
$$mix_s = e^{i*2*\pi*s*Ifc/Tf}.$$

The resulting baseband I and Q signals from mixers 305 and 307 are low pass filtered in low pass filters 308 and 309 (step 512) and the outputs of low pass filters 308 and 309 are applied to the digital signal processor 310 through resamplers 325 and 328.

In step 515, the previously stored matched filter formed from the transmitter pulse is recalled from the store 320 and complex convolution of the baseband I and Q signals from filters 308 and 309 with the matched filter derived from the transmit pulse is performed in the processor 310 using a complex finite impulse response filter in the time domain as follows.

Rsig=cfir(matched,rsig); complex impulse response filter

An FFT in the frequency domain can also be used as long as it is performed with an overlap and save technique well known in the art and described, for example at page 113 of "Digital Signal Processing" by Alan V. Opennheim and Ronald W. Shafer, Prentice Hall, 1975. The overlap and save technique includes repeating the last two steps while overlapping the outcome fast Fourier transform as shown in table 4.

TABLE 4

| | |
|---|---|
| fm = cfft(matched) | complex fast Fourier transform of matched filter |
| Frsig = cfft(rsig) | complex fast Fourier transform of received signal |
| $Frsig_s = frjsg_s*(fm_s)*filt_s$ | product in frequency domain of matched filter and received signal |
| rsig = icfft(frsig) | inverse Fourier transform of output signal |

Upon completion of the complex convolution in the step 515, step 520 $i_s$ entered in which the target information is extracted by the processing of the processor 310 based on the match filtered I and Q components of the return signal. Step 505 is then reentered to await the end of the next transmit pulse.

Figure 6:
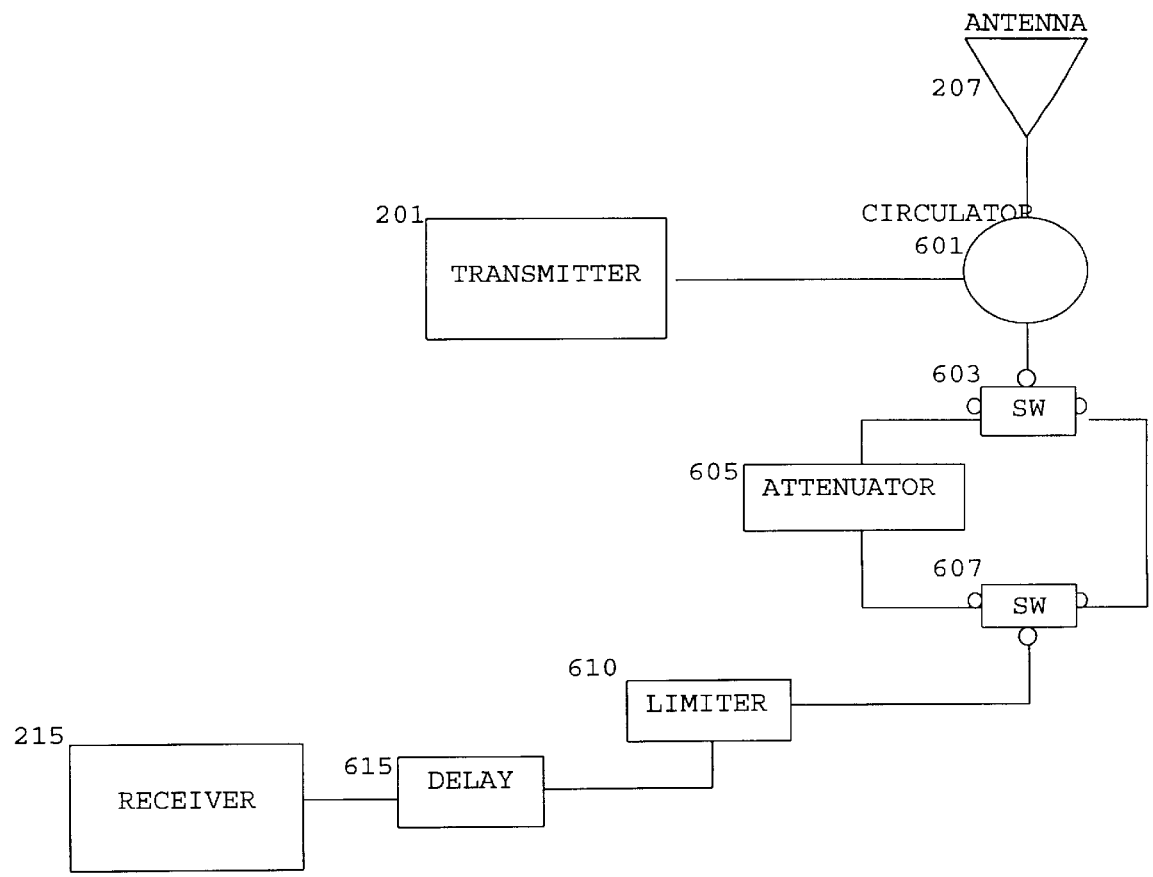
FIG. 6 shows schematically a circuit arrangement for attenuating and delaying the transmitter coupled pulse according to the invention.

FIG. 6 shows an alternative arrangement for coupling the transmitter and the receiver of the radar system of FIG. 2 so that the transmit pulse coupled to the receiver to generate a matched filter does not saturate the receiver and thereby distort signal phase information. In FIG. 6, the transmitter 201 is coupled to the antenna 207 through a circulator 601 and the antenna 207 is coupled to the receiver via switch 603, attenuator 605, switch 607, limiter 610 and delay 615 during the transmit pulse. The combination of the circulator, switches, attenuator and limiter reduces the signal applied to the receiver to a level that provides a proper magnitude for match filter formation and avoids saturation. The attenuator may for example be set at 70 dB and the limiter may for example be set at −20 dB. The delay 615 may be set so that the coupling of the transmitter pulse to the receiver is delayed until the termination of high power transmit pulse to avoid adverse effects in the receiver caused by the generation of the transmit pulse.

Alternatively, the coupling arrangements of FIG. 2 may be used with a delay between the attenuator-limiter 210 and the non-coherent receiver 215 to assure that the matched filter for the transmit pulse is formed after termination of generation of the transmit pulse. After the termination of the transmit pulse, switches 603 and 607 are set to directly couple the circulator 601 to the input of the limiter 610 since the attenuation needed for generation of a matched filter from the high power transmit pulse is removed.

The radar system of FIG. 2 may also be used to acquire Doppler information of the return signal by processing the matched filter generated by the digital signal processor 225 in response to the received waveform of the transmitter pulse and processing the return signal after is passes through the matched filter. The processing of the matched filter to determine a Doppler shift includes determining the phase differences between coefficients of adjacent samples near the center of the filter and taking the average of these phase differences.

Figure 8:
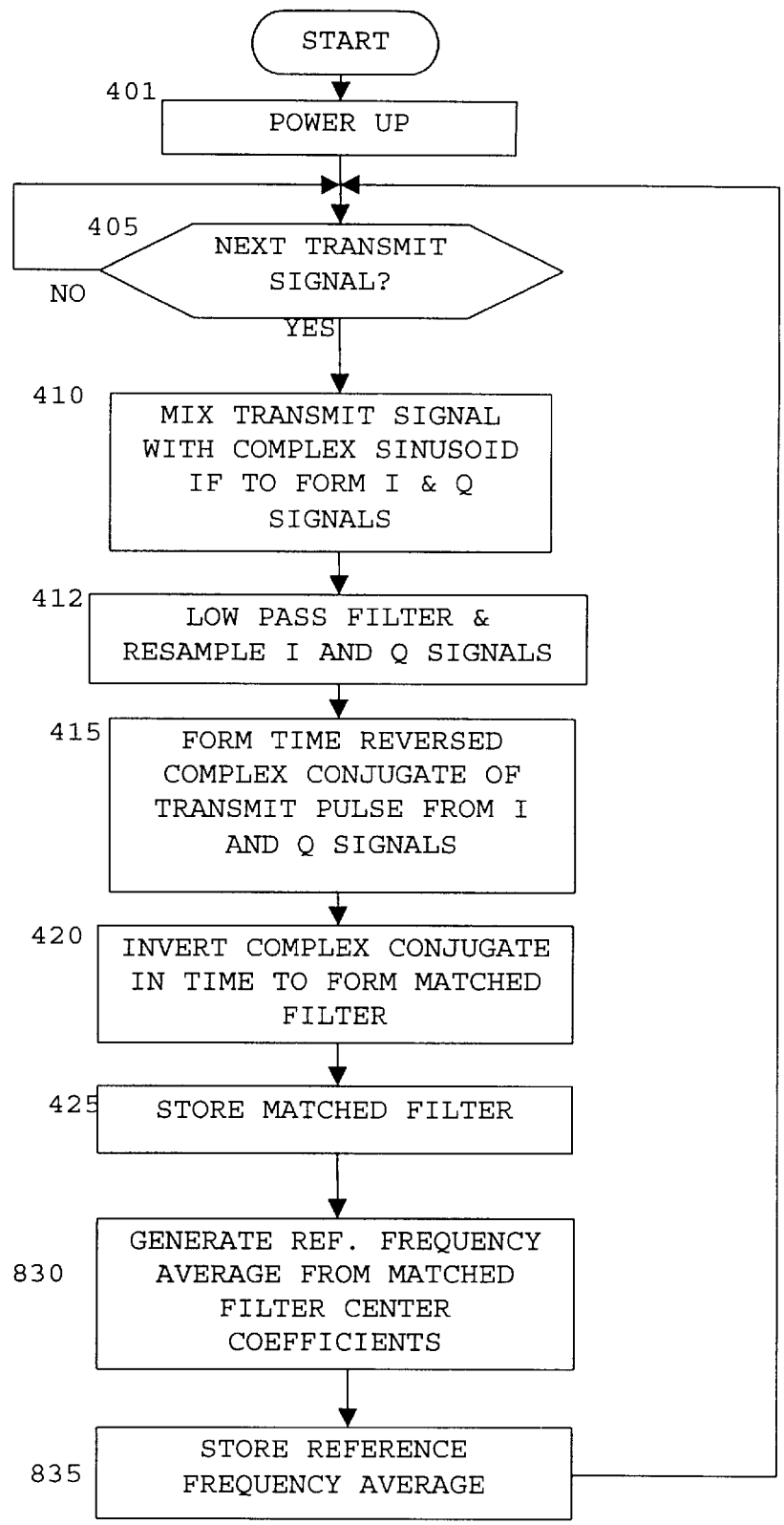
FIG. 8 is a flow chart illustrating generation of an average reference frequency of the transmit pulse for determination of Doppler shift.

FIG. 8 shows the operations of the digital signal processor 225 to produce a matched filter and then to generate a reference frequency for Doppler shift processing. The operations in FIG. 8 of steps 401 through 425 for forming and storing the matched filter are the same as disclosed with respect to FIG. 4 and are not repeated. After the matched filter is stored in step 425, step 830 is entered in which a reference frequency average is formed from the stored matched filter coefficients. The details of the formation of the reference frequency average are shown in the flow chart of FIG. 9.

Figure 9:
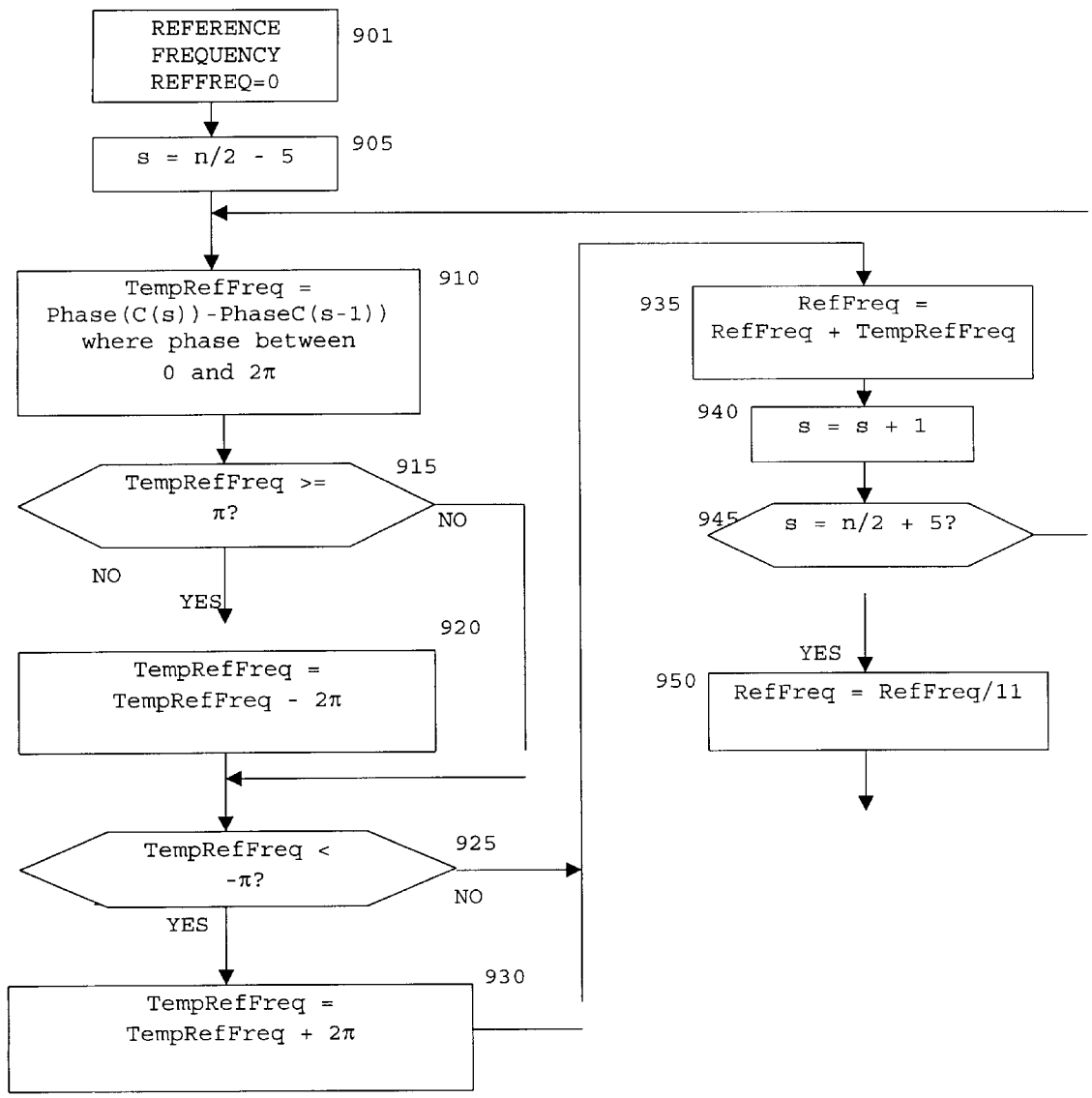
FIG. 9 is a more detailed flow chart showing processing of the matched filter to form the average reference frequency of the transmit pulse waveform of FIG. 8.

Referring to FIG. 9, the reference frequency storage location is first set to zero in step 901 and the sample index is set to n/2−5 where n is the width of the transmit pulse n/2 is the center sample. In step 910, a signal corresponding to the difference between the phase of the coefficient of the s sample and the phase of the preceding s−1 sample is formed according to TRF=phase (C(s))−phase (C(s−1)) where the phase is between zero and 2π.

The TRF is tested in the decision step 915 as to whether it is more than or equal to n. If so, TRF is reset to TRF−2π in step 920. Control is passed from step 915 or step 920 to decision step 925 in which it is determined whether the TRF is less than −π. If so, TRF is reset to TRF+2π in step 930. Step 935 is then entered from either step 925 or 930 and the reference frequency RF is set to RF+TRF. The sample index is incremented in step 940 and the incremented step s+1 is tested in decision step 945 as to whether the last central sample of the samples from s=n/2−5 to s=n/2+5 has been processed. Until s=n/2+5, the steps 910 through 945 are iterated so that the sum of the TRFs is formed. When s=n/2+5, the average of the reference frequency RF is formed in the step 950. This reference frequency average RF is stored in the step 835 of FIG. 8.

When the return signal responsive to the transmitter pulse passes through the matched filter (i.e., is correlated with the matched filter), the output has both magnitude and phase information. If the magnitude of the matched filter output is greater than a predetermined threshold, the phase information from the matched filter is sufficient for determination of Doppler shift. The average signal frequency around the peak output of the matched filter is determined and the difference between the return signal average signal frequency and the matched filter reference frequency average that corresponds to the Doppler shift is formed.

Figure 10:
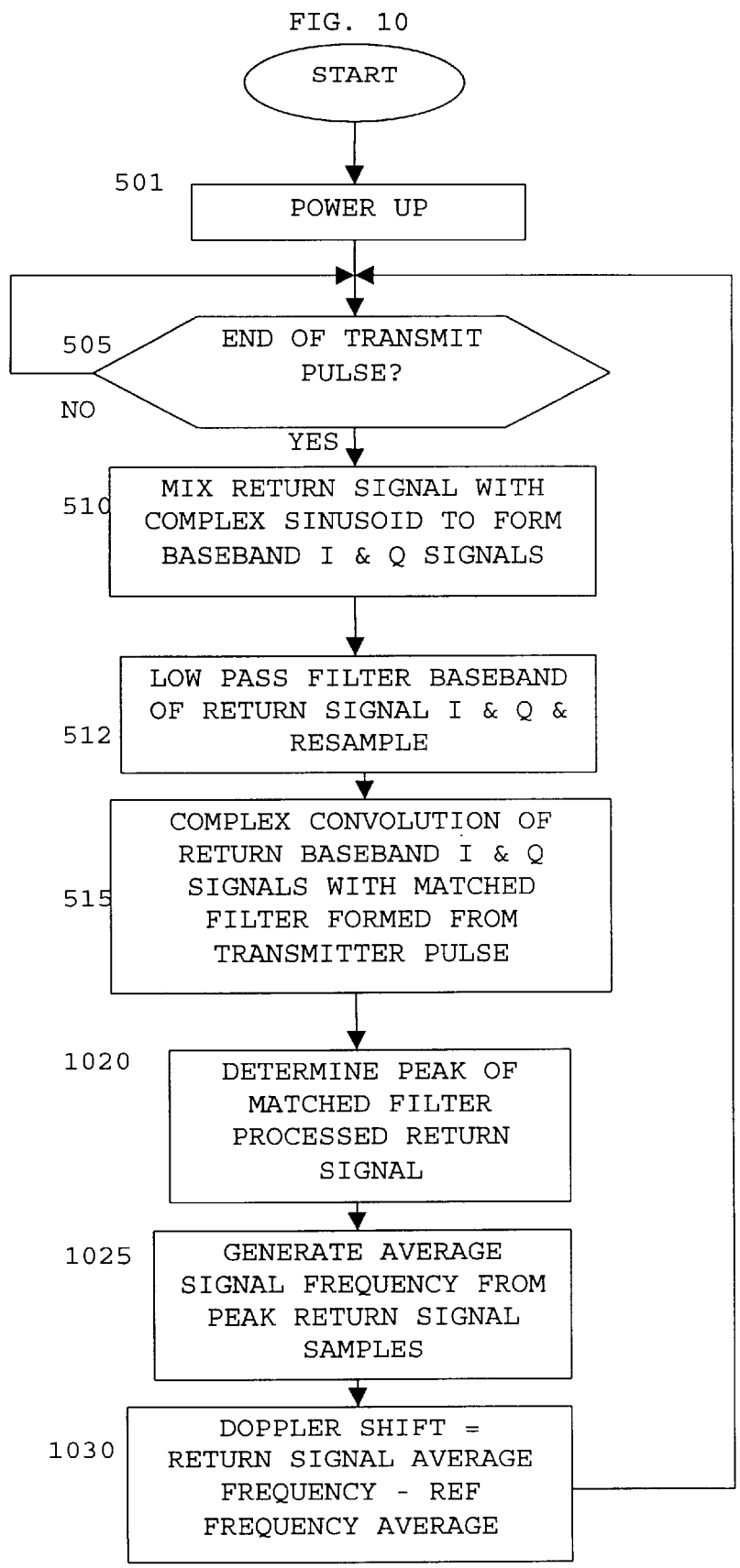
FIG. 10 is a flow chart illustrating the determination of Doppler shift from the average reference frequency and the average frequency of the matched filter processed return signal.

FIG. 10 shows the operations of the digital signal processor 225 in producing a complex convolution of the return I and Q signals with the matched filter and then generating the Doppler shift. The operations in FIG. 10 of steps 501 through 515 for forming the convolution of the return signal and the matched filter are the same as disclosed with respect to FIG. 5 and are not repeated. After the complex convolution of the step 515 in FIG. 10, the peak of the matched filter processed return signal is determined in step 1020. The average signal frequency is generated from the peak return samples in step 1025 and the Doppler shift is determined in the step 1030 as the difference between the return signal average and the reference frequency average stored in the step 835 of FIG. 8.

Figure 11:
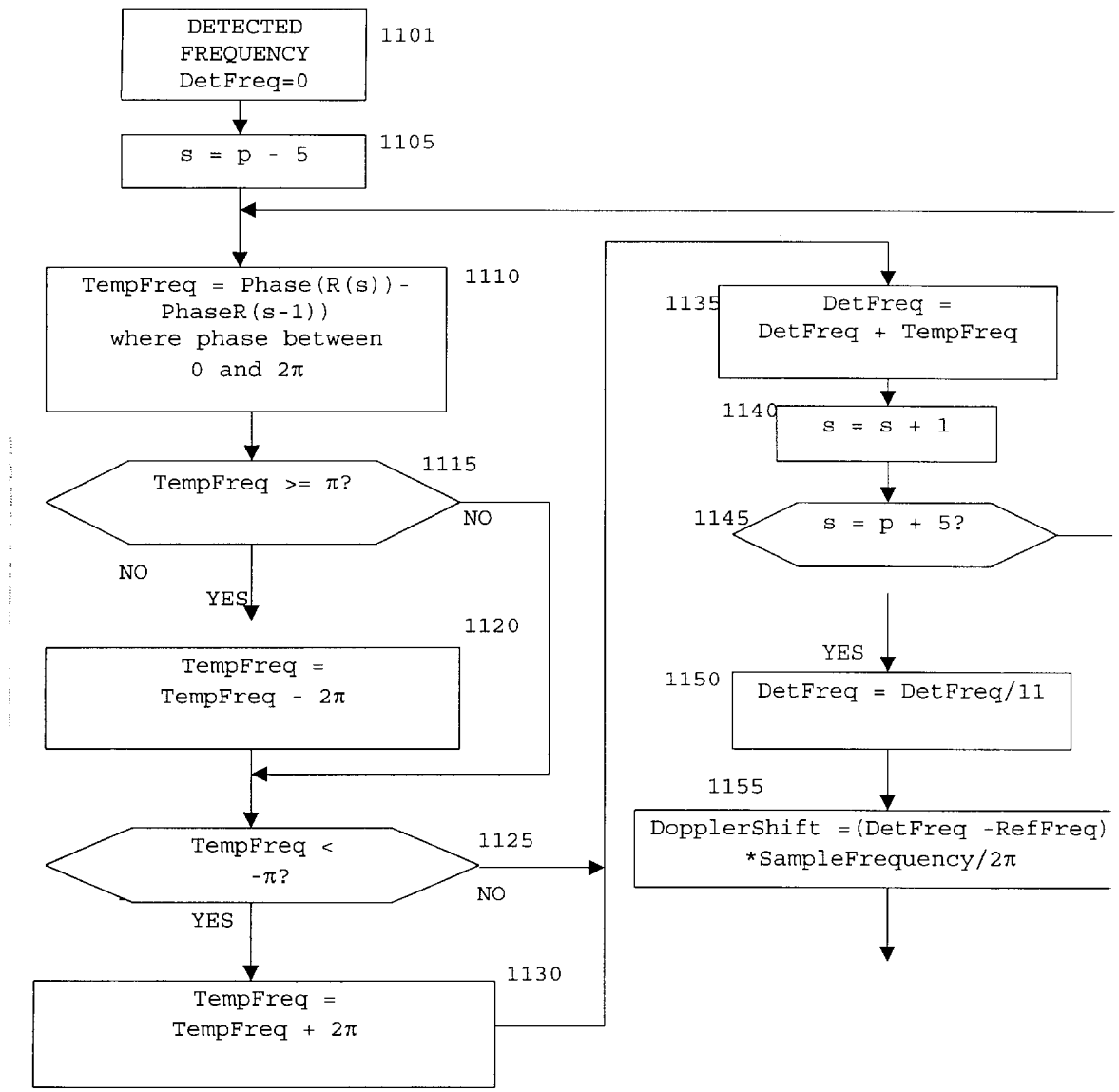
FIG. 11 is a more detailed flow chart showing processing of the match filtered return signal to form an average frequency thereof and the generation of the Doppler shift from the average frequency of the matched filtered return signal and the average reference frequency of the transmit pulse waveform.

The flow chart of FIG. 11 illustrates a processing arrangement of the digital signal processor 225 in the steps 1020, 1025 and 1030 that determine the Doppler shift by processing the matched filter output responsive to the return signal and forming the difference between the return signal frequency average and the matched filter reference frequency average. In FIG. 11, the detected frequency DetFreq is set to zero in step 1101 and the return signal sample index is set to s=p−5 in step 1105 where p is the peak sample. A temporary frequency TF is set to the difference between the phase of the matched filter processed return signal R(s) and the phase of the preceding matched filter processed return signal R(s1) in step 1110 where the phase is between zero and 2π. Decision step 1115 is then entered in which it is determined whether the TF is more than or equal to π. If so, the TF is set to TF−2π in the step 1120.

Decision step 1125 is entered from either step 1115 or step 1120 and it is tested whether TF is less than −π. If less than −π, the TF is set to TF+2π in the step 1130. Control is passed from the step 1125 or the step 1130 to step 1135 in which the detected frequency DF is set to DF+TF. The sample index s is incremented in step 1140 to s+1 and is tested in decision step 1145 as to whether the sample p+5 has been processed. Until a yes decision is reached in the step 1145, the loop of steps 1110 through 1145 is reiterated. After the sample p+5 has been processed, the sum of the peak centered samples formed in the step 1135 is divided by the number of central samples to form an average detected frequency in step 1150. The Doppler shift in degrees is then generated in step 1155 according to Doppler shift=(DetFreq−RefFreq)*SampleFrequency/2π as shown in the step 1030 of FIG. 10.

While the invention has been described by way of particular illustrative embodiments, it is to be understood that the invention is not limited to the above-described embodiments but that various changes and modifications may be made by those of ordinary skill in the art without departing from the scope and spirit of the invention. Accordingly, the foregoing embodiments should not be construed as limiting the scope of the invention that is encompassed instead by the following claims.

What is claimed is:

1. A receiver in a radar system having a transmitter for producing pulses to be radiated by an antenna, the receiver comprising:

means responsive to a transmitter produced pulse for performing complex demodulation of a waveform corresponding to the produced pulse;

means responsive to the complex demodulated waveform corresponding to the produced pulse for forming a filter representative of the pulses produced by the transmitter;

means for receiving a return signal corresponding to each pulse produced by the transmitter from the antenna;

means for performing complex demodulation of the return signal; and means for correlating the complex demodulated return signal with the filter representative of the pulses produced by the transmitter.

2. A receiver in a radar system according to claim 1, wherein a filter is formed for each pulse produced by the transmitter and the correlating means correlates the complex demodulated return signal with the filter formed for the pulse corresponding to the return signal.

3. A receiver in a radar system according to claim 1, wherein the filter formed in response to the complex demodulated waveform of the produced pulse comprises a matched filter.

4. A receiver in a radar system according to claim 3, wherein the matched filter comprises a time reversed conjugate image of the waveform corresponding to the produced pulse.

5. A receiver in a radar system according to claim 1, further comprising means for delaying performing complex demodulation of the waveform corresponding to the produced pulse at least for a time corresponding to a width of the produced pulse.

6. A receiver in a radar system according to claim 1, wherein the means responsive to the transmitter produced pulses for performing complex demodulation of a waveform corresponding to the produced pulse comprises means coupled between the transmitter and the receiver for attenuating and limiting the produced pulse.

7. A receiver in a radar system according to claim 1, wherein the transmitter is coupled to the receiver through a circulator, an attenuator and a limiter during the pulse produced by the transmitter.

8. A receiver in a radar system according to claim 1, wherein the antenna is coupled to the receiver through a circulator and a limiter after termination of the pulse produced by the transmitter.

9. A receiver in a radar system according to claim 1, further comprising:
   means responsive the formed transmission pulse representative filter for generating a signal representing an average frequency of coefficients of central samples of the transmission pulse representative filter;
   means responsive the correlated complex demodulated return signal for forming a signal representing an average frequency of peak centered samples of the correlated complex demodulated return signal; and
   means responsive to the average frequency of the peak centered samples of the correlated complex demodulated return signal and the average frequency of the coefficients of central samples of the transmission pulse representative filter for generating a Doppler shift indicator.

10. A method of detecting a target in a radar receiver of a radar system having a transmitter producing pulses for radiation by an antenna, the method comprising the steps of:
   performing a complex demodulation of a waveform corresponding to the pulse produced by the transmitter in the receiver;
   forming a filter representative of the pulse produced by the transmitter responsive to the complex demodulated waveform in the receiver;
   receiving a return signal corresponding to each pulse produced by the transmitter from the antenna;
   performing complex demodulation of the return signal; and
   correlating the complex demodulated return signal with the filter representative of the pulses produced by the transmitter.

11. A method according to claim 10, wherein the filter forming step includes forming a filter for each pulse produced by the transmitter and the correlating step includes correlating the complex demodulated return signal with the filter formed for the pulse corresponding to the return signal.

12. A method according to claim 10, wherein the filter formed in response to the complex demodulated waveform corresponding to the produced pulse comprises a matched filter.

13. A method according to claim 12, wherein the matched filter comprises a time reversed conjugate image of the waveform corresponding to the produced pulse.

14. A method according to claim 10, further comprising the step of delaying performing complex demodulation of the waveform corresponding to the pulse produced by the transmitter at least for a time corresponding to a width of the produced pulse.

15. A method according to claim 10, wherein the step of performing complex demodulation of the waveform corresponding to the produced pulse includes attenuating and limiting the produced pulse from the transmitter to limit the waveform for complex demodulation.

16. A method according to claim 10, wherein the transmitter is coupled to the receiver through a circulator, an attenuator and a limiter during the pulse produced by the transmitter.

17. A method according to claim 10, wherein the antenna is coupled to the receiver through a circulator and a limiter after a termination of the pulse produced by the transmitter.

18. A method according to claim 10, further comprising the steps of:
   generating a signal representing an average frequency of coefficients of central samples of the transmission pulse representative filter responsive the formed transmission pulse representative filter;
   forming a signal representing an average frequency of peak centered samples of the correlated complex demodulated return signal responsive the correlated complex demodulated return signal for; and
   generating a Doppler shift indicator responsive to the average frequency of the peak centered samples of the correlated complex demodulated return signal and the average frequency of the coefficients of central samples of the transmission pulse representative filter.

19. A radar system comprising:
   an antenna;
   a transmitter for producing pulses to be radiated by the antenna;
   a receiver for detecting target information from return signals responsive to the pulses produced by the transmitter;
   in the receiver:
      means responsive to the pulses produced by the transmitter for performing complex demodulation of a waveform corresponding to a produced pulses;
      means responsive to the complex demodulated waveform corresponding to the produced pulse for forming a filter representative of the pulses produced by the transmitter;
      means for receiving a return signal corresponding to each pulse produced by the transmitter from the antenna;
      means for performing complex demodulation of the return signal; and
      means for correlating the complex demodulated return signal with the filter representative of the pulses produced by the transmitter.

20. A radar system according to claim 19, wherein a filter is formed for each pulse produced by the transmitter and the correlating means correlates the complex demodulated return signal with the filter formed for the pulse corresponding to the return signal.

21. A radar system according to claim 19, wherein the filter formed in response to the complex demodulated waveform comprises a matched filter.

22. A radar system according to claim 21, wherein the matched filter comprises a time reversed conjugate image of the waveform corresponding to the produced pulse.

23. A radar system according to claim 19, wherein the receiver further comprises means for delaying performing complex demodulation of the waveform corresponding to the produced pulse at least for a time corresponding to a width of the produced pulse.

24. A radar system according to claim 19, wherein the means for performing complex demodulation of a waveform corresponding to the produced pulse comprises means coupled between the transmitter and the receiver for attenuating and limiting the produced pulse.

25. A radar system to claim 19, wherein the transmitter is coupled to the receiver through a circulator, an attenuator and a limiter during the pulse produced by the transmitter.

26. A radar system according to claim 19, wherein the antenna is coupled to the receiver through a circulator and a limiter after termination of the pulse produced by the transmitter.

27. A radar system according to claim 19, further comprising:

means responsive the formed transmission pulse representative filter for generating a signal representing an average frequency of coefficients of central samples of the transmission pulse representative filter;

means responsive the correlated complex demodulated return signal for forming a signal representing an average frequency of peak centered samples of the correlated complex demodulated return signal; and means responsive to the average frequency of the peak centered samples of the correlated complex demodulated return signal and the average frequency of the coefficients of central samples of the transmission pulse representative filter for generating a Doppler shift indicator.

28. In a receiver of a radar system having a transmitter producing pulses for radiation by an antenna, a computer usable medium having computer readable program code units embodied therein comprising:

a first program code unit for performing a complex demodulation of a waveform corresponding to a pulse produced by the transmitter;

a second program code unit for forming a filter representative of the pulses produced by the transmitter responsive to the complex demodulated waveform;

a third program code unit for receiving a return signal corresponding to each pulse produced by the transmitter from the antenna;

a fourth program code unit for performing complex demodulation of the received return signal; and a fifth program code unit for correlating the complex demodulated return signal with the filter representative of the pulses of produced by the transmitter.

29. In a receiver of a radar system having a transmitter producing pulses for radiation by an antenna, a computer usable medium having computer readable program code units embodied therein according to claim 28, wherein the fourth program code unit comprises a program code unit for forming a filter for each pulse produced by the transmitter and the fifth program code unit comprises a program code unit for correlating the complex demodulated return signal with the filter formed for the pulse corresponding to the return signal.

30. In a receiver of a radar system having a transmitter producing pulses for radiation by an antenna, a computer usable medium having computer readable program code units embodied therein according to claim 28, wherein the filter formed in response to the complex demodulated waveform comprises a matched filter.

31. In a receiver of a radar system having a transmitter producing pulses for radiation by an antenna, a computer usable medium having computer readable program code units embodied therein according to claim 30, wherein the matched filter comprises a time reversed conjugate image of the waveform corresponding to the produced pulse.

32. In a receiver of a radar system having a transmitter producing pulses for radiation by an antenna, a computer usable medium having computer readable program code units embodied therein according to claim 28, further comprising a program code unit for delaying performing complex demodulation of the waveform corresponding to the pulse produced by the transmitter at least for a time corresponding to a width of the produced pulse.

33. In a receiver of a radar system having a transmitter producing pulses for radiation by an antenna, a computer usable medium having computer readable program code units embodied therein according to claim 28, further comprising:

a program code unit for generating a signal representing an average frequency of coefficients of central samples of the transmission pulse representative filter responsive the formed transmission pulse representative filter;

a program code unit for forming a signal representing an average frequency of peak centered samples of the correlated complex demodulated return signal responsive the correlated complex demodulated return signal for; and a program code unit for generating a Doppler shift indicator responsive to the average frequency of the peak centered samples of the correlated complex demodulated return signal and the average frequency of the coefficients of central samples of the transmission pulse representative filter.

34. A receiver in a radar system having a transmitter for producing pulses to be radiated by an antenna, the receiver comprising:

a signal receiving unit including a coupler for receiving the pulse produced by the transmitter and a coupler for receiving from the antenna a return signal corresponding to each pulse produced by the transmitter;

a signal processor comprising:

a demodulator processing unit responsive to a transmitter produced pulse for performing complex demodulation of a waveform corresponding to the produced pulse;

a filter processing unit responsive to the complex demodulated waveform corresponding to the produced pulse for forming a filter representative of the pulses produced by the transmitter;

a demodulator processing unit for performing complex demodulation of the return signal; and a correlating processing unit for correlating the complex demodulated return signal with the filter representative of the pulses produced by the transmitter.

35. A receiver in a radar system according to claim 34, wherein the filter processing unit forms a filter for each pulse produced by the transmitter and the correlating processing unit correlates the complex demodulated return signal with the filter formed for the pulse corresponding to the return signal.

36. A receiver in a radar system according to claim 34, wherein the filter formed by the signal processor in response to the complex demodulated waveform of the produced pulse comprises a matched filter.

37. A receiver in a radar system according to claim 36, wherein the matched filter formed by the signal processor comprises a time reversed conjugate image of the waveform corresponding to the produced pulse.

38. A receiver in a radar system according to claim 34, wherein the coupling unit for receiving the pulse produced by the transmitter comprises a delay unit for delaying performing complex demodulation of the waveform corresponding to the produced pulse at least for a time corresponding to a width of the produced pulse.

39. A receiver in a radar system according to claim 34, wherein the coupling unit for receiving the pulse produced by the transmitter comprises a coupling unit responsive to the transmitter produced pulses for attenuating and limiting the produced pulse prior to complex demodulation.

40. A receiver in a radar system according to claim 34, wherein the coupling unit for receiving the pulse produced by the transmitter comprsies a circulator, an attenuator and a limiter operative during the pulse produced by the transmitter.

41. A receiver in a radar system according to claim 34, wherein the coupler for receiving the return signal comprises a circulator and a limiter operative after termination of the pulse produced by the transmitter.

42. A receiver in a radar system according to claim 34, further comprising:
- a processing unit responsive the formed transmission pulse representative filter for generating a signal representing an average frequency of coefficients of central samples of the transmission pulse representative filter;
- a processing unit responsive the correlated complex demodulated return signal for forming a signal representing an average frequency of peak centered samples of the correlated complex demodulated return signal; and
- a processing unit responsive to the average frequency of the peak centered samples of the correlated complex demodulated return signal and the average frequency of the coefficients of central samples of the transmission pulse representative filter for generating a Doppler shift indicator.

43. A radar system comprising:
- an antenna;
- a transmitter for producing pulses to be radiated by the antenna;
- a receiver for detecting target information from return signals responsive to the pulses produced by the transmitter;
- in the receiver:
  - a signal receiving unit including a coupler for coupling the pulse produced by the transmitter to the receiver and a coupler for receving a return signal corresponding to each produced pulse from the antenna; and
  - a signal processor comprising:
    - a demodulating processing unit responsive to the pulses produced by the transmitter for performing complex demodulation of a waveform corresponding to a produced pulses;
    - a filter processing unit responsive to the complex demodulated waveform corresponding to the produced pulse for forming a filter representative of the pulses produced by the transmitter;
    - a demodulating processing unit for performing complex demodulation of the return signal; and
    - a correlating processing unit for correlating the complex demodulated return signal with the filter representative of the pulses produced by the transmitter.

44. A radar system according to claim 43, wherein a filter is formed for each pulse produced by the transmitter and the correlating processing unit correlates the complex demodulated return signal with the filter formed for the pulse corresponding to the return signal.

45. A radar system according to claim 43, wherein the filter formed in response to the complex demodulated waveform comprises a matched filter.

46. A radar system according to claim 45, wherein the matched filter comprises a time reversed conjugate image of the waveform corresponding to the produced pulse.

47. A radar system according to claim 43, wherein the receiver further comprises a delay unit for delaying performing complex demodulation of the waveform corresponding to the produced pulse at least for a time corresponding to a width of the produced pulse.

48. A radar system according to claim 43, wherein the the coupler for coupling the pulse produced by the transmitter comprises an attenuating and limiting unit for attenuating and limiting the produced pulse.

49. A radar system to claim 43, wherein the coupler for coupling the produced pulse comprises a circulator, an attenuator and a limiter operative during the pulse produced by the transmitter.

50. A radar system according to claim 43, wherein the coupler for receiving the return pulse comprises a circulator and a limiter operative after termination of the pulse produced by the transmitter.

51. A radar system according to claim 43, further comprising:
- a processing unit responsive the formed transmission pulse representative filter for generating a signal representing an average frequency of coefficients of central samples of the transmission pulse representative filter;
- a processing unit responsive the correlated complex demodulated return signal for forming a signal representing an average frequency of peak centered samples of the correlated complex demodulated return signal; and
- a processing unit responsive to the average frequency of the peak centered samples of the correlated complex demodulated return signal and the average frequency of the coefficients of central samples of the transmission pulse representative filter for generating a Doppler shift indicator.

* * * * *

UNITED STATES PATENT AND TRADEMARK OFFICE
CERTIFICATE OF CORRECTION

PATENT NO. : 6,211,815 B1  
DATED : April 3, 2001  
INVENTOR(S) : Richey et al.

Page 1 of 1

It is certified that error appears in the above-identified patent and that said Letters Patent is hereby corrected as shown below:

<u>Title page,</u>  
Item [63] should read -- "This application is a continuation of and claims priority from Provisional Application No. 60/152,896 09/08/1999"

Signed and Sealed this

Fifth Day of February, 2002

Attest:

JAMES E. ROGAN  
*Director of the United States Patent and Trademark Office*

*Attesting Officer*